United States Patent
Freund et al.

(10) Patent No.: US 12,495,077 B2
(45) Date of Patent: Dec. 9, 2025

(54) EFFICIENT ARBITRARY POLICIES FOR DATA AUTHORIZATION DECISION POINTS

(71) Applicant: Dell Products L.P., Round Rock, TX (US)

(72) Inventors: Werner Spolidoro Freund, Rio de Janeiro (BR); Iam Palatnik de Sousa, Rio de Janeiro (BR); João Victor Pinto, Rio de Janeiro (BR); Micael Veríssimo de Araújo, Rio de Janeiro (BR); Roberto Nery Stelling Neto, Rio de Janeiro (BR); Sarah Evans, Parker, CO (US)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 18/343,863

(22) Filed: Jun. 29, 2023

(65) Prior Publication Data

US 2025/0007955 A1    Jan. 2, 2025

(51) Int. Cl.
*H04L 9/40*     (2022.01)
*G06F 40/30*     (2020.01)

(52) U.S. Cl.
CPC ............ *H04L 63/20* (2013.01); *G06F 40/30* (2020.01)

(58) Field of Classification Search
CPC ................................ H04L 63/20; G06F 40/30
See application file for complete search history.

(56) References Cited

U.S. PATENT DOCUMENTS

| | | | | |
|---|---|---|---|---|
| 2022/0269853 A1* | 8/2022 | Itani | ................. | G06F 40/103 |
| 2023/0334016 A1* | 10/2023 | Kernick | ............. | G06F 16/1748 |
| 2024/0095463 A1* | 3/2024 | Leary | ................. | G06F 40/20 |
| 2024/0296295 A1* | 9/2024 | Russell | ............. | G06F 40/56 |
| 2024/0403373 A1* | 12/2024 | Chao | ................. | G06F 16/9538 |

OTHER PUBLICATIONS

DISA and NSA, 2021. Department of Defense Zero Trust Reference Architecture, Version 1.0.
Vaswani, A., Shazeer, N., Parmar, N., Uszkoreit, J., Jones, L., Gomez, A.N., Kaiser, Ł. and Polosukhin, I., 2017. Attention is all you need. Advances in neural information processing systems, 30.

(Continued)

*Primary Examiner* — SM A Rahman
(74) *Attorney, Agent, or Firm* — Workman Nydegger

(57) ABSTRACT

One example method includes receiving a data file at a large language model (LLM). Arbitrary tags that include labels that are attachable to the data file and prompts are also received. The prompts are paired with the arbitrary tags to form arbitrary tag-prompt pairs and include information that is used by the LLM to find the paired arbitrary tag. The LLM determines a selected subset of the arbitrary tags that apply to the data file. A trust module receives the selected subset of the arbitrary tags that apply to the data file and data access policies that specify access rules for the data file. A conditional access decision is determined that specifies whether access should be given to the data file.

20 Claims, 8 Drawing Sheets

(56) References Cited

OTHER PUBLICATIONS

Zaheer, M., Guruganesh, G., Dubey, K.A., Ainslie, J., Alberti, C., Ontanon, S., Pham, P., Ravula, A., Wang, Q., Yang, L. and Ahmed, A., 2020. Big bird: Transformers for longer sequences. Advances in Neural Information Processing Systems, 33, pp. 17283-17297.
Tabbles, 2022. Auto-tagging files based on content. Available at: https://tabbles.net/auto-tagging-files-based-content/.
Microsoft Purview, 2022. Learn about trainable classifiers. Available at: https://learn.microsoft.com/en-us/microsoft-365/compliance/classifier-learn-about?view=o365-worldwide.
Microsoft, 2022. Secure data with Zero Trust. Available at: Secure data with Zero Trust | Microsoft Learn.
Liu, P., Yuan, W., Fu, J., Jiang, Z., Hayashi, H. and Neubig, G., 2021. Pre-train, prompt, and predict: A systematic survey of prompting methods in natural language processing. arXiv preprint arXiv:2107.13586.

\* cited by examiner

EFFICIENT ARBITRARY POLICIES FOR DATA AUTHORIZATION DECISION POINTS

FIELD OF THE INVENTION

Embodiments of the present invention generally relate to a data authorization decision point in a Zero Trust Architecture (ZTA). More particularly, at least some embodiments of the invention relate to systems, hardware, software, computer-readable media, and methods for implementing arbitrary data tags and access policies for use by the data authorization decision point.

BACKGROUND

Zero Trust Architecture (ZTA) is used to guide the development and implementation of security measures for services and assets. To properly protect data and prevent data loss or leakage, ZTA implements a Data Authorization Decision Point which is to be applied to all data access, including those with textual content.

Due to increasing cybernetwork complexity, such components must be able to easily determine arbitrary authorization policies that efficiently generalize to new documents. Summarizing document content in tags allows to simplify the process of defining these arbitrary policies in terms of high-level specificities of the content.

However, there are many problems with existing Data Authorization Decision Points. These problems include:

- Most systems rely solely on user-defined tags, which is not compliant with Zero Trust once it completely entrusts the user and disregards the data content. Solely relying on the user makes it difficult to design efficient, scalable, and arbitrary policies. A user may improperly, accidentally, or intentionally, mistag a document, resulting in inconsistent access policies. Additionally, even if users properly define tags, the tags are subject to subjectivity noise, resulting in additional inefficiencies and potential security risks;
- Expert-driven approaches result in systems where it is hard to derive general rules that apply well to several scenarios as rules are typically either too simple or too complex to generalize well; and
- Current data-driven methods cannot extract document syntheses containing rich semantics because they rely on limited training corpus and/or modelling approaches with limited computational or statistical efficiencies, i.e., requiring (usually exponentially) more data and computational effort to achieve the same results. This implies in the following problems: (1) The lack of rich semantics makes it difficult to derive a method capable of generating arbitrary large number of tags at once, which undermines the data policy capability of relying on arbitrary tag content, being limited to a few more common tags and (2) having a rich synthesis of the document content can be useful to improve decision making process and such information is not available with current technology.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
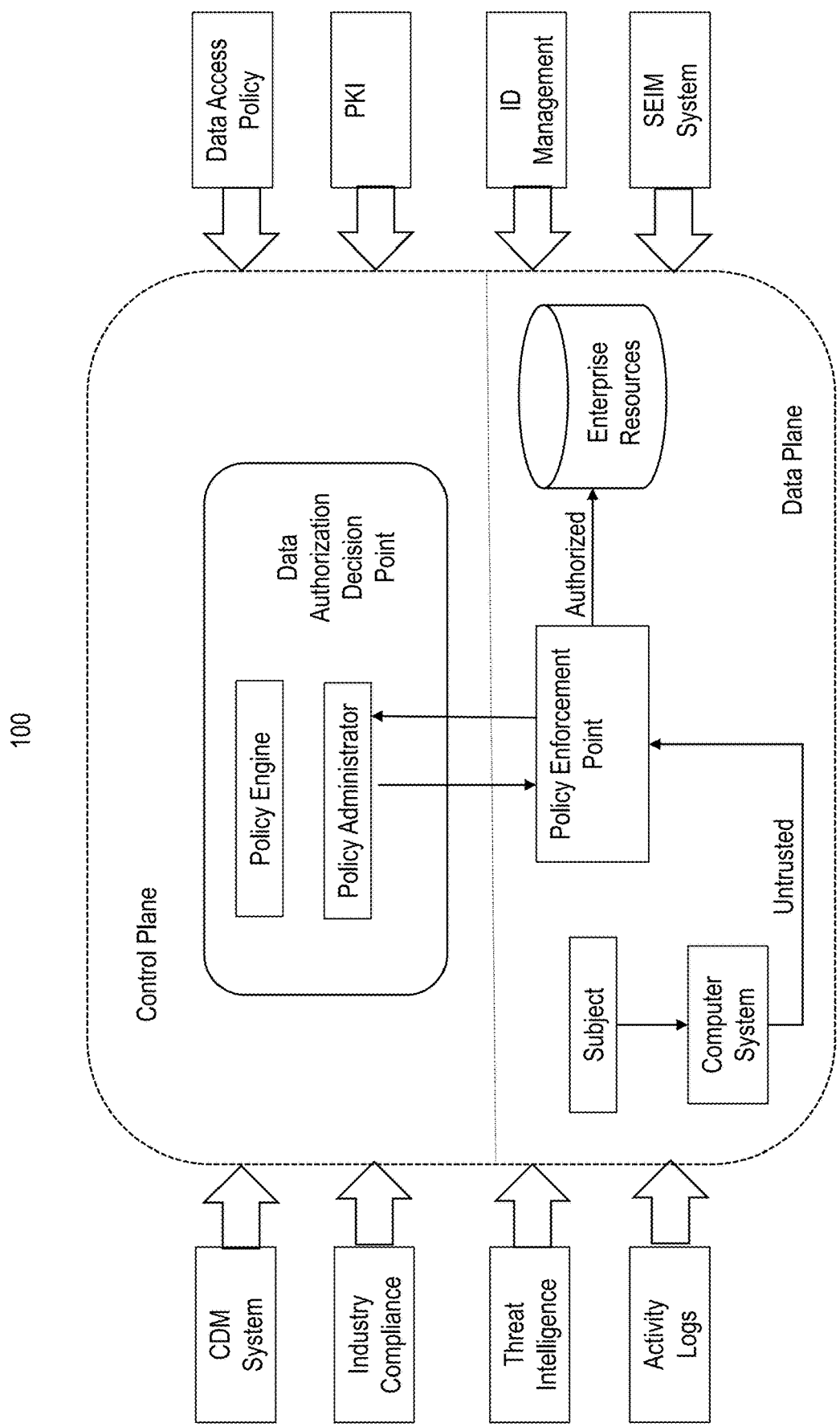
FIG. 1 discloses an embodiment of a conceptual framework for a Zero Trust Architecture (ZTA) according to the embodiments disclosed herein.

Embodiments of the present invention generally relate to a data authorization decision point in a Zero Trust Architecture (ZTA). More particularly, at least some embodiments of the invention relate to systems, hardware, software, computer-readable media, and methods for implementing arbitrary data tags and access policies for use by the data authorization decision point.

One example method includes receiving a data file at a large language model (LLM). Arbitrary tags that include labels that are attachable to the data file and prompts are also received. The prompts are paired with the arbitrary tags to form arbitrary tag-prompt pairs and include information that is used by the LLM to find the paired arbitrary tag. The LLM determines a selected subset of the arbitrary tags that apply to the data file. A trust module receives the selected subset of the arbitrary tags that apply to the data file and data access policies that specify access rules for the data file. A conditional access decision is determined that specifies whether access should be given to the data file.

The current invention is related to a data authorization decision point leveraging an automated system capable of capturing a summary representation of textual content containing rich semantics and using it to allow the efficient and scalable derivation of arbitrary policies as required by ZTA. The data authorization decision point of the current invention relies on a model pre-trained on large textual corpus with a computationally and statistically efficient approach which allows the extraction of content summary with rich semantics.

Beyond being able to extract rich semantics, the current invention circumvents the need of adjusting the pre-trained model, therefore providing arbitrary tags with a more computationally and statistically efficient approach. Whenever a policy requires a new tag, the system takes advantage of a prompt engineering approach to efficiently determine whether the document content indicates the arbitrary tag. In other words, the system directly uses the pre-trained model, but introduces knowledge regarding the tag as an input to the pre-trained model instead of adapting the model itself.

The availability of rich semantics together with prompt engineering reduces the need of samples, around a few dozens, which can be provided by any subject expert directly or using expert-driven rules. The system then evaluates the generalization capabilities on these samples and determines whether the derived policy can be employed or not based on its efficiency.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of Zero Trust

Zero Trust provides a collection of concepts designed to minimize uncertainty in enforcing accurate, least privilege per-request access decisions in information systems and services in the face of a network viewed as contested. That is, there may be a malicious actor on the network that can intercept or initiate communication. Zero Trust is fundamentally comprised of a set of principles upon which information technology architectures are planned, deployed, and operated. As such, there is no single specific Zero Trust infrastructure implementation or architecture. Zero Trust solutions depend on the workflow being analyzed and the resources that are used in performing that workflow.

FIG. 1 illustrates an embodiment of a conceptual framework 100 that can be used as a tool for the development of a Zero Trust Architecture (ZTA) that be used in security and other applications. The roles of the core components depicted in the embodiment of the conceptual framework 100 are summarized below:

(1) Policy Enforcement Point (PEP): Interacts with applications and endpoints to grant access permission to a resource. Gathers information for PE and follows instructions from PA;
(2) Policy Engine (PE): Evaluates resource access requests based on information from various data sources;
(3) Policy Administrator (PA): Establishes, maintains, and terminates sessions between the subject and resource;
(4) Information feeds (left and right): Includes a set of codified policies, identities, environmental factors, and historical data used by the PE to generate resource access decisions.

As noted in FIG. 1, the PA and the PE are part of what is referred to as a data authorization decision point. In some embodiments of a ZTA, network activity is continually verified by the data authorization decision point using multi-attribute and multi-checkpoint confidence-based levels that enable authentication and authorization policies. The data authorization decision point to be disclosed in further detail herein is used to determine access conditions for various data.

B. Aspects of Large Language Models (LLM)

In Natural Language Processing (NLP), transformer architectures are the state-of-the-art models for extracting a summary with rich content from large textual corpus. The models trained in this way are often referred to as Large Language Models (LLMs). Such models are able to efficiently perform a variety of tasks including, but not limited to, text classification, text summarization, question answering, named entity recognition, speech tagging, and text generation.

A common element in many of these models is the presence of a so-called "self-attention mechanism". This mechanism is a type of mapping that allows a model to learn which words in a sentence should be observed with more emphasis, for each task a model is trained to do. It shows the model how each given word relates to each other word in each context, creating a rich representation that has frequently been cited as the main reason for the success of these architectures.

Figure 2:
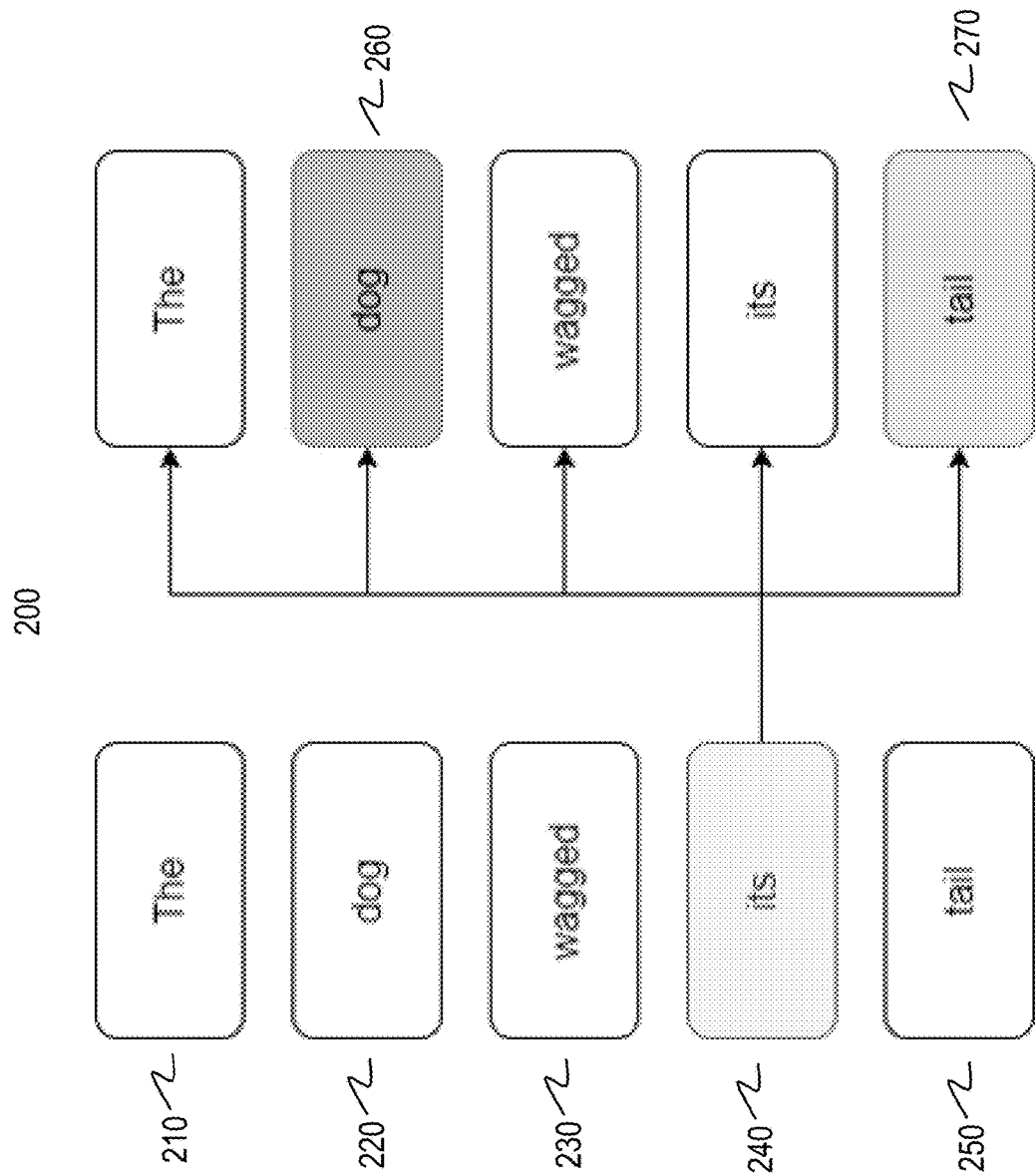
FIG. 2 discloses aspects of an example of a self-attention mechanism according to the embodiments disclosed herein.

For example, FIG. 2 shows a simple example of a self-attention mechanism 200 for the sentence "the dog wagged its tail". As shown in FIG. 2, the sentence includes "the" 210, "dog" 220, "wagged" 230, "its" 240, and "tail" 250. FIG. 2 also shows based on the shading at 260 that the word "its" 240 has a high correlation with the word "dog" 220 and based on the shading at 270 a lower correlation with the word "tail" 250. There are negligible correlations with the rest of the sentence. Thus, the high correlation between the word "its" 240 and the word "dog" 220 shows that "its" 240 is referring to "dog" 220 and not to the other words in the sentence. This type of representation is often useful for models to get better performance in a variety of tasks.

The self-attention mechanism, also known as full attention, however, can have high computational costs when used with large documents, including full scientific papers, full patents, news articles, among others. Accordingly, in some embodiments, the use of a prompt has been implemented to help in the training and operation of the LLM models. A prompt may be a textual example of expected answers that helps the LLM models to predict a desired result. For example, a prompt that includes example sentences of a story may help the LLM model to predict what should come next in the story.

C. Example Embodiment of a Data Authorization Decision Point

Figure 3:
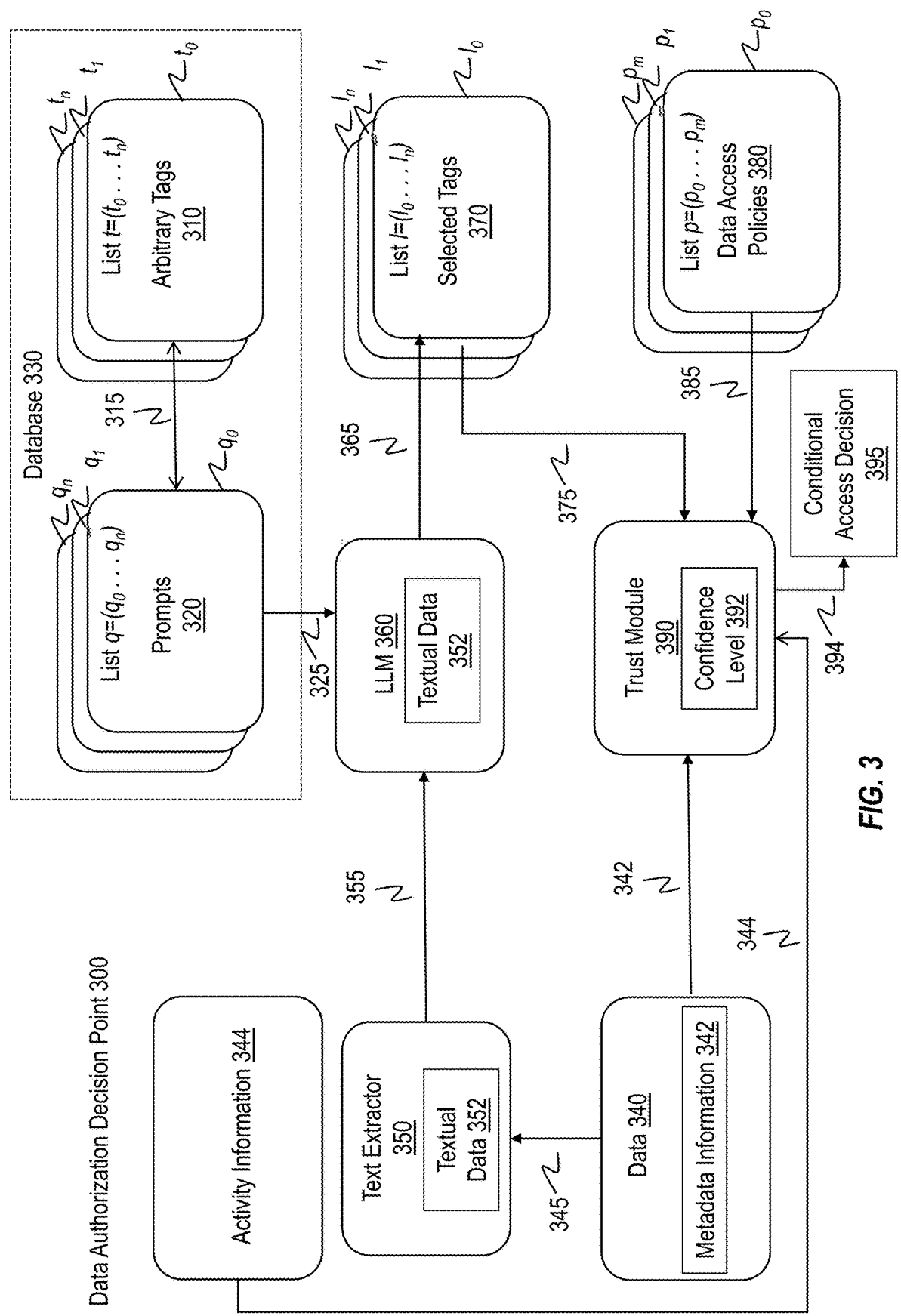
FIG. 3 discloses aspects of a data authorization decision point according to the embodiments disclosed herein.

FIG. 3 illustrates an example embodiment of a data authorization decision point 300, which corresponds to the data authorization decision point discussed previously in relation to FIG. 1. FIG. 3 also illustrates a process flow of the data authorization decision point 300 as will be explained in further detail.

As illustrated, the data authorization decision point 300 includes a list $t=(t_0 \ldots t_n)$ of arbitrary tags 310. The list of arbitrary tags 310 includes a full set of arbitrary tags being currently employed by the data authorization decision point 300. The list as illustrated includes an arbitrary tag $t_0$, an arbitrary tag $t_1$, ... and an arbitrary tag $t_n$. Thus, there may be any number of arbitrary tags 310 employed by the data authorization decision point 300 at any given time.

Each of the arbitrary tags is a label that is attached to a data file. For example, the arbitrary tags 310 may include labels that indicate a level of privacy for the data file and could include the following tags: "public", "internal use", "restricted", and "highly restricted". The arbitrary tags 310 may include labels that indicate the type of data file such as "legal document", "contract", "purchase order", "invention disclosure document", and "business plan". The arbitrary tags 310 may be generated by a human expert or they may be based on expert driven rules. Accordingly, the embodiments disclosed herein are not limited to any specific type of arbitrary tag or by how the arbitrary tags are generated.

The data authorization decision point 300 also includes a list $q=(q_0 \ldots q_n)$ of prompts 320. Thus, the list as illustrated includes a prompt $q_0$, a prompt $q_1$, ... and a prompt $q_n$. Each of the prompts 320 are paired with a corresponding arbitrary tag 310 as illustrated at 315. Thus, the arbitrary tags 310 and the prompts 320 form a number of tag-prompt pairs. Each of the prompts 320 includes information that aids a machine learning model such as a Large Language Model (LLM) 360 to find the arbitrary tag 310 that is paired with the prompt.

For example, suppose the arbitrary tag $t_0$ is "public", meaning that data of this type is open for public view and use. In this case, the prompt $q_0$ that is paired with the arbitrary tag $t_0$ may include a number of sentences from documents that are tagged as being public. These sentences show the LLM 360 what types of documents should be tagged as public. Alternatively, the prompt $q_0$ may be a pointer that points to one or more documents that have been tagged as being public. In some embodiments, the prompt $q_0$ may include additional ways to identify the arbitrary tag $t_0$. Accordingly, it will be appreciated that there may be any number of ways to structure the prompts 320 and the thus the embodiments disclosed herein are not limited to any particular type or structure of the prompts 320.

In some embodiments, the arbitrary tags 310 and the prompts 320 are stored in a database 330. In this way, the arbitrary tags 310 and the prompts 320 are available for use by the other elements of the data authorization decision point 300 as needed.

As illustrated in FIG. 3, the data authorization decision point 300 receives data file 340. The data file 340 may be any type of data and may include textual content and non-textual content. In some embodiments, the data file 340 includes metadata information 342. The metadata information 342 includes information about the data such as, but not limited to, file size, file creation date, identify of the party who created the file, and/or read/write access policies of the data. It will be appreciated that the metadata information 342 may include any type of reasonable information about the data and thus the embodiments disclosed herein are not limited to the number or type of information included in the metadata information 342.

In some embodiments, the data authorization decision point 300 also includes activity information 344. The activity information 344 includes information about the context of the operating environment of the data file 340. For example, the activity information 344 may include, but is not limited to, information about the party trying to access the data file 340, the location where a request for the data file 340 was made, a device the request for the data file 340 was made from, and/or the time that the request for the data file 340 was made. It will be appreciated that the activity information 344 may include any type of reasonable information about the context of the operating environment of the data file 340 and thus the embodiments disclosed herein are not limited to the number or type of information included in the activity information 344.

The data file 340 is provided to a text extractor 350, which may be any reasonable text extractor as shown at 345. In operation, the text extractor 350 extracts textual data 352 from the data file 340. As shown at 355, the textual data 352 is provided to the LLM 360.

The LLM 360 is a pretrained large language machine-learning model and may be implemented as any reasonable LLM model. In operation, the LLM 360 receives the textual data 352 as an input. In addition, the LLM 360 receives each of the tag 310 and prompt 320 pairs as inputs as shown at 325. The LLM model tests each tag-prompt pair individually against the textual data 352 to find those arbitrary tags 310 that can be applied to the textual data 352. For example, the LLM 360 may test the arbitrary tag $t_0$ "public" and its paired prompt $q_0$ against the textual data 352. If the textual data 352 includes data that is of the type included in the prompt $q_0$, then the LLM 360 is able to determine that the textual data 352 should be tagged as "public". In addition, if the textual data 352 includes data that is of a type that matches another of the prompts 320, then the textual data 352 would also be tagged with the arbitrary tag 310 that is paired with that prompt. For instance, the arbitrary tag could be "company news" and the prompt include examples of company news. In such case, if the textual data 352 includes data that includes company news, then the textual data may be tagged as both public and as company news.

However, if the textual data 352 does not include data that is of a type that matches another of the prompts 320, then the textual data 352 would not be tagged with the arbitrary tag 310 that is paired with that prompt. For instance, the arbitrary tag could be "invention disclosure" and the prompt include examples of invention disclosures. In such case, if the textual data 352 did not include data that includes an invention disclosure, then the textual data would not be tagged as an invention disclosure. Accordingly, it will be appreciated that the textual data 352 may be tagged with only one tag or with multiple tags as circumstances warrant.

In the embodiment of the data authorization decision point 300 shown in FIG. 3, the LLM 360 outputs a list $l=(l_0 \ldots l_n)$ of selected tags 370 as shown at 365. The list of selected tags 370 includes those arbitrary tags that were determined by the LLM 360 to apply to the textual data 352. Thus, the list as illustrated includes a selected tag $l_0$, a selected tag $l_1$, ... and a selected tag $l_n$. It will be appreciated that the selected tags 370 will be a subset of the list of the arbitrary tags 310 as the textual data 352 would not include data that would match all the arbitrary tags. For example, if the textual data 352 was of a type that would be tagged as public, then it could not also be tagged as restrictive.

As shown in FIG. 3, the data authorization decision point 300 includes a list $p=(p_0 \ldots p_m)$ of data access policies 380. Thus, the list as illustrated includes a data access policy $p_0$, a data access policy $p_1, \ldots$ and a data access policy $p_n$. The data access policies 380 specify access rules that control how different types of data can be accessed and can be defined in any manner suitable to the organization implementing the data authorization decision point 300. For example, one data access policy 380 may specify that only data tagged as public can be sent outside of the organization implementing the data authorization decision point 300. Another data access policy 380 may specify that only company executives can access data that is tagged as highly restrictive. A further data access policy may specify that only a request for data generated in the location of the organization implementing the data authorization decision point 300 or a request generated using a device owned by the organization implementing the data authorization decision point 300 can access any data. It will be appreciated that there may be any number of different data access policies that can be defined by the organization implementing the data authorization decision point 300 according to the organization's needs. Accordingly, the embodiments disclosed herein are not limited by the number or type of data access policies. Although not illustrated, in some embodiments the data access policies 380 may be stored in the database 330 or a different database so that they are available to the data authorization decision point 300 when needed.

The data authorization decision point 300 also includes a trust module 390 that receives as input the selected tags 370 as shown at 375 and the data access policies 380 as shown at 385. In some embodiments, the trust module 390 also receives the metadata information 342 and/or the activity information 344 as inputs. In operation, the trust module 390 uses a trust algorithm to determine whether access should be given to the data file 340 based on the inputs it has received. For example, if the trust module 390 determines that a request for the data file 340 will fail one or more of the data access policies 380, then the trust module will determine that access should not be given because a data access policy is not satisfied.

However, there will often be cases where all of the data access policies are satisfied. In such cases, the trust module 390 will determine a confidence level 392 based on the other inputs. For example, if the metadata information 342 is determined to be anomalous then perhaps the trust module 390 will determine a low confidence level 392. In addition, if the request for the data file 340 is received from a country where the organization implementing the data authorization decision point 300 is not located, then a low confidence level 392 may also be determined. On the other hand, if the trust module 390 does not find any anomalies in the inputs it receives, then a high level of confidence level 392 may be determined.

As shown at 394, the trust module 390 provides its determinations, including whether the data access policies have been satisfied and the confidence level it has determined to a decision point of the data authorization decision point 300, where a conditional access decision 395 regarding the data file 340 is made. The conditional access decision 395 specifies whether access to the data file 340 should be granted. The conditional access decision 395 is then provided to a policy enforcement point of the zero trust architecture, such as the policy enforcement point discussed in relation to FIG. 1, which has the responsibility to enforce the conditional access decision.

D. Designing New Data Access Policies

As discussed above, the data authorization decision point 300 uses the data access policies 380 when making the conditional access decision 395. The embodiments disclosed herein advantageously allow for the organization implementing the data authorization decision point 300 to add new data access policies as needed. In addition, the embodiments disclosed herein allow for the addition of new arbitrary tags 310 and prompts 320 when needed by the addition of a new access data policy.

In some embodiments, however, the addition of a new data access policy 380 may negatively impact the use of the data authorization decision point 300. That is, some new policies will have a poor efficiency that impacts a user's experience in a negative way. For example, a new data access policy may specify that if there are any arbitrary tags associated with a data file, then that data file cannot be accessed by anyone. Such a data access policy would of course mean that this data file is not accessible and so would be very inefficient. Although this is an extreme example, it shows the need to ensure that new data access policies and the tags and prompts that are relied on by the new data access policy are efficient enough so as to not negatively impact the system. Advantageously, the embodiments disclosed herein, in addition to allowing for new data access policies, also provide a mechanism for testing the efficiency of the new data access policy and the tags and prompts that are relied on by the new data access policy.

Figure 4:
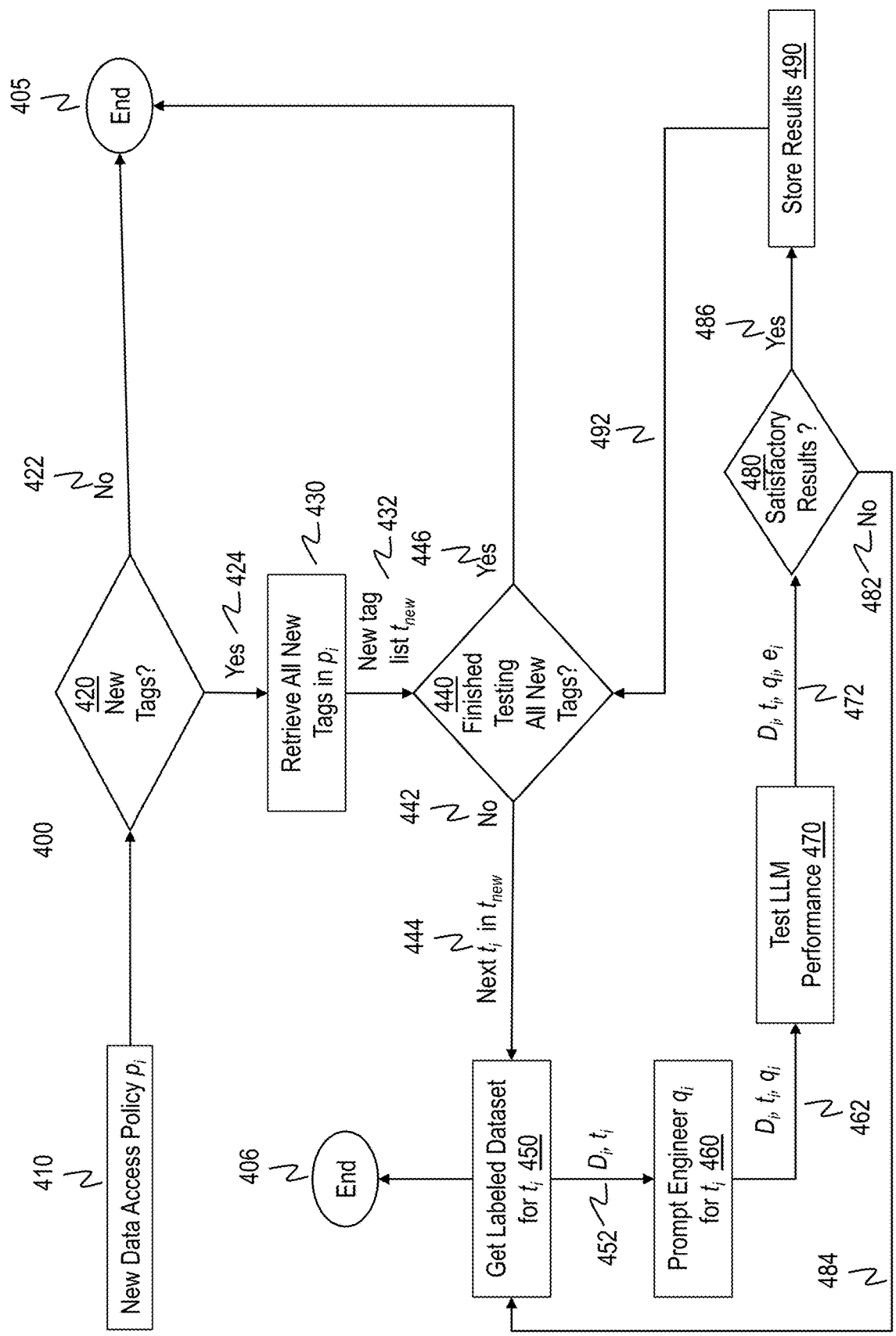
FIG. 4 discloses aspects of adding access policies to the data authorization decision point according to the embodiments disclosed herein.

FIG. 4 illustrates a process flow 400 for adding a new data access policy and then testing the efficiency of the new data access policy and the tags and prompts that are relied on by the new data access policy. As shown, a new data access policy $p_i$ 410 is introduced into the data authorization decision point 300. At a decision block 420, the system determines if there are any new arbitrary tags used by the new data access policy $p_i$ 410. If the system determines that there are not any new arbitrary tags associated with the new data access policy p; 410 as shown at 422, then the process flow ends as shown at 405. That is, if the new data access policy $p_i$ 410 only uses arbitrary tags that are included in the existing arbitrary tags 310 that are already part of the data authorization decision point 300, it can be assumed that the new data access policy $p_i$ 410 is efficient enough to be used because the system can already efficiently use the existing arbitrary tags 310.

If the system determines at the decision block 420 that there are new arbitrary tags used by the new data access policy $p_i$ 410 as shown at 424, the system retrieves all the new arbitrary tags as shown at 430 and generates a new arbitrary tag list $t_{new}$ 432. The new arbitrary tag list $t_{new}$ 432 includes arbitrary tags $t_i=(t_0 \ldots t_n)$. The system then tests each of the arbitrary tags $t_i$ in the new arbitrary tag list $t_{new}$ 432.

At decision block 440, the system determines if each of the arbitrary tags $t_i$ in the new arbitrary tag list $t_{new}$ 432 has been tested. If the system determines that each of the arbitrary tags $t_i$ in the new arbitrary tag list $t_{new}$ 432 has not been tested as shown at 442, the system tests the next arbitrary tag $t_i$ in the new arbitrary tag list $t_{new}$. 432 as shown at 444.

During the test for each next arbitrary tag $t_i$ in the new arbitrary tag list $t_{new}$ 432, a labeled dataset $D_i$ is obtained as shown at 450. The labeled dataset $D_i$ can be obtained from an expert who has also designed the new data access policy $p_i$ 410. Alternatively, the labeled dataset $D_i$ can be obtained using expert-driven rules, where precision may be prioritized over recall.

As shown at 452, the next arbitrary tag $t_i$ and the labeled dataset $D_i$ are provided to a prompt engineering step 460 for determining a prompt $q_i$ for the tag $t_i$. The prompt $q_i$ may be determined by the expert or by an automated process using any reasonable method of prompt engineering.

As shown at 462, the labeled dataset $D_i$, the next arbitrary tag $t_i$, and the prompt $q_i$ are then used to test the performance of an LLM such as the LLM 360 as shown at 470. The performance test is done by having the LLM process the new data access policy $p_i$ 410 using the labeled dataset $D_i$, the next arbitrary tag $t_i$, and the prompt $q_i$. An efficiency rating $e_i$ is generated based on the performance of the LLM.

At a decision block 480, it is determined if the performance of the LLM is satisfactory. In one embodiment, it is determined if a performance rating $e_i$ generated using the labeled dataset $D_i$, the next arbitrary tag $t_i$, and the prompt $q_i$ as shown at 472 meets a predetermined threshold set by the expert who has also designed the new data access policy $p_i$ 410. Alternative ways of determining if the performance of the LLM is satisfactory may also be used.

If the system determines that the LLM performance results are not satisfactory as shown at 482, the process of testing the next arbitrary tag $t_i$ is repeated as shown at 484. During the repeated process, the expert may incrementally increase the labeled dataset $D_i$ or make other changes to the labeled dataset $D_i$ as needed. Alternatively, further prompt engineering may be performed by the expert or by an automated process to determine a new prompt $q_i$. In some embodiments, changes may be made to the labeled dataset $D_i$ and further prompt engineering may be performed as needed. The LLM then tests the new data access policy $p_i$ 410 using the updated or original labeled dataset $D_i$, the next arbitrary tag $t_i$, and the updated or original prompt $q_i$ and a determination is again made if the results are satisfactory.

If the results are again not satisfactory, the process of testing the next arbitrary tag $t_i$ may again be repeated as shown at 484. However, if after any number of times of repeating the process, it is determined that the new data access policy $p_i$ 410 is not going to be efficient enough for the data authorization decision point 300 to use, the process may be ended as shown at 406.

When the system determines that the LLM performance results are satisfactory as shown at 486, either after an initial test of the LLM performance or after the repeated process shown at 484, the next arbitrary tag $t_i$ and the prompt $q_i$ are stored as shown at 490. Thus, the next arbitrary tag $t_i$ is added to the arbitrary tags 310 and the prompt $q_i$ is added to the prompts 320 since these can be used by the new data access policy $p_i$ 410 in an efficient manner that does not disrupt the system.

As shown at 492, the process returns to decision block 440. If there are additional next arbitrary tags $t_i$ in the new arbitrary tag list $t_{new}$ 432 that still need to be tested, then the system will test these tags in the manner previously described. However, if the system determines that each of the arbitrary tags $t_i$ in the new arbitrary tag list $t_{new}$ 432 has been tested as shown at 446, the process flow ends as shown at 405 since there are no further arbitrary tags $t_i$ to test. The new data access policy $p_i$ 410 is then added to the data access policies 380.

In some embodiments, before adding the new data access policy $p_i$ 410 to the data access policies, further tests are performed to ensure the new data access policy $p_i$ 410 does not cause disruptive behavior. In such embodiments, new documents that contain all the arbitrary tags in the data access policy are selected and then used to determine the performance of the new data access policy $p_i$ 410. In addition, documents that do not contain at least one of the tags are selected and used to determine the performance of the new data access policy $p_i$ 410.

E. Example Uses

The data authorization decision point 300 may be used in a zero trust architecture in response to a request for access to the data file 340. That is, a request is made for the data file 340 and the process of the data authorization decision point 300 previously described in relation to FIG. 3 is used to determine the conditional access decision 395. The data authorization decision point 300 can also be employed in the zero trust architecture in the following scenarios:

File access/transfer/sharing: the system can apply policies to determine whether the destination is allowed to receive/view the specific content;

Email traffic & messaging: the content can be tagged to avoid sensitive data leakage according to policies;

Documents uploaded in collaboration tools can be tagged automatically and control policies reinforced to reduce data leak risks.

Advantageously, the data authorization decision point 300 may be employed in additional scenarios inside of a the zero trust architecture and outside of the zero trust architecture. Examples of such scenarios will now be explained in relation to FIGS. 5A-5C.

Figure 5B:
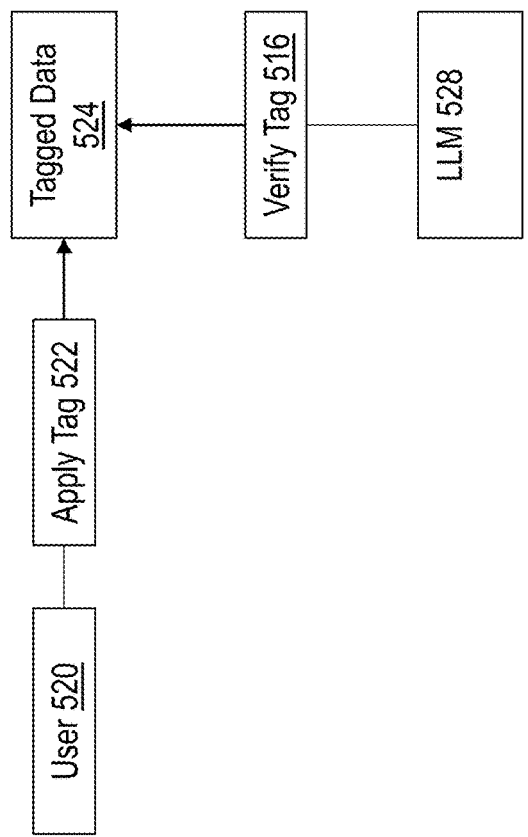
FIGS. 5A-5C disclose aspects of uses of the data authorization decision point according to the embodiments disclosed herein.
Figure 5A:
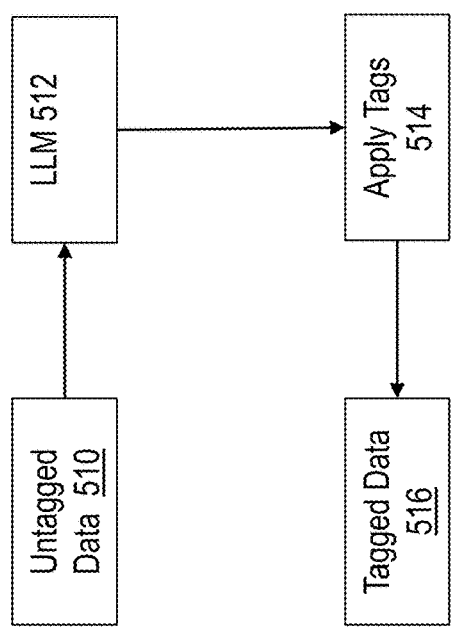

FIG. 5A illustrates a scenario where the data authorization decision point 300 or at least a portion of the data authorization decision point 300 is used to automatically tag untagged data. As shown, the figure includes untagged data 510 that is fed to an LLM 512, which corresponds to the LLM 360. As discussed previously, the LLM 512 receives the arbitrary tags 310 and the prompts 320 and then determines which tags should be applied to the untagged data. As shown at 514, the LLM 512 determines which tags (i.e., the selected tags 370) to apply to the untagged data 510, resulting in tagged data 516. This process can also be used periodically on the tagged data 516 to ensure that the data is still properly tagged or updated if needed.

FIG. 5B illustrates a scenario where the data authorization decision point 300 or at least a portion of the data authorization decision point 300 is used as an automatic tagging assistant. As shown, a user 520 can apply a tag as shown at 522 to tagged data 524. An LLM 528, which corresponds to the LLM 360, receives the arbitrary tags 310 and the prompts 320 and then can verify as shown at 516 that the tag applied at 522 is a good tag for the data. In addition, the LLM 528 can suggest additional selected tags 370 that can also be applied to the tagged data 524. Thus, the system can be used to aid the user 520 by suggesting tags of interest or by automatically applying them and asking the user for confirmation. The automated tagging assistant prevents relying solely on the user, which can make it difficult to design efficient scalable and arbitrary data access policies. It has an advantage of reducing the burden on the user to generate exhaustive lists and remember all the possible tags of interest that should be employed. Since the system suggests the tags, it may result in lower subjectivity and human error since the user is only required to make a binary decision.

Figure 5C:
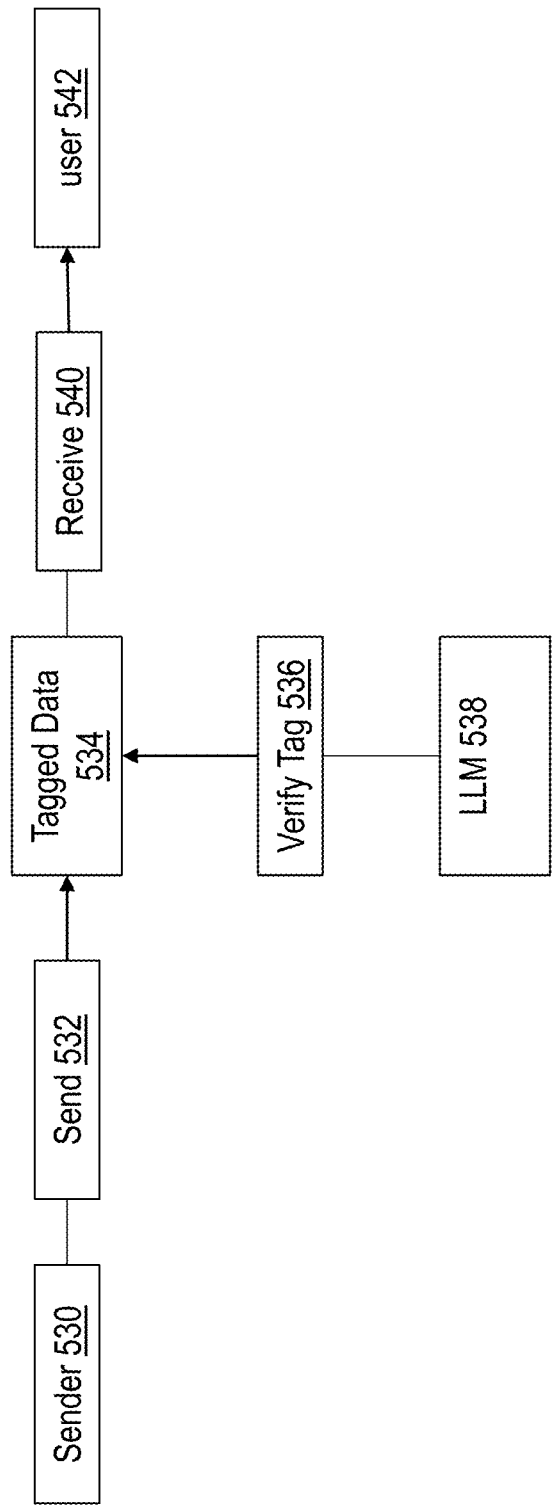

FIG. 5C illustrates a scenario where the data authorization decision point 300 or at least a portion of the data authorization decision point 300 is used as a send/receive detector. As shown, a user 530 desires to send 532 tagged data 534 to a user 542. For example, the tagged data 534 may be tagged as public and so it should be allowed to send the data to the user 542. An LLM 538, which corresponds to the LLM 360, can verify as shown at 536 that the tag applied to the tagged data is correct by using the arbitrary tags 310 and prompts 320 in the manner previously described. Thus, if the data is incorrectly tagged as public when it should be tagged as restricted, the system can prevent the data from being sent. However, if the data is tagged correctly as public, then the data can be sent and received 540 by the user 542. This process can also be used to detect unwanted data from being received. Thus, the system can be used to detect whether any improperly tagged documents are about to be sent or received through any improper communication channels and either halt the transaction or require further confirmation from qualified personnel.

F. Example Methods

Figure 6:
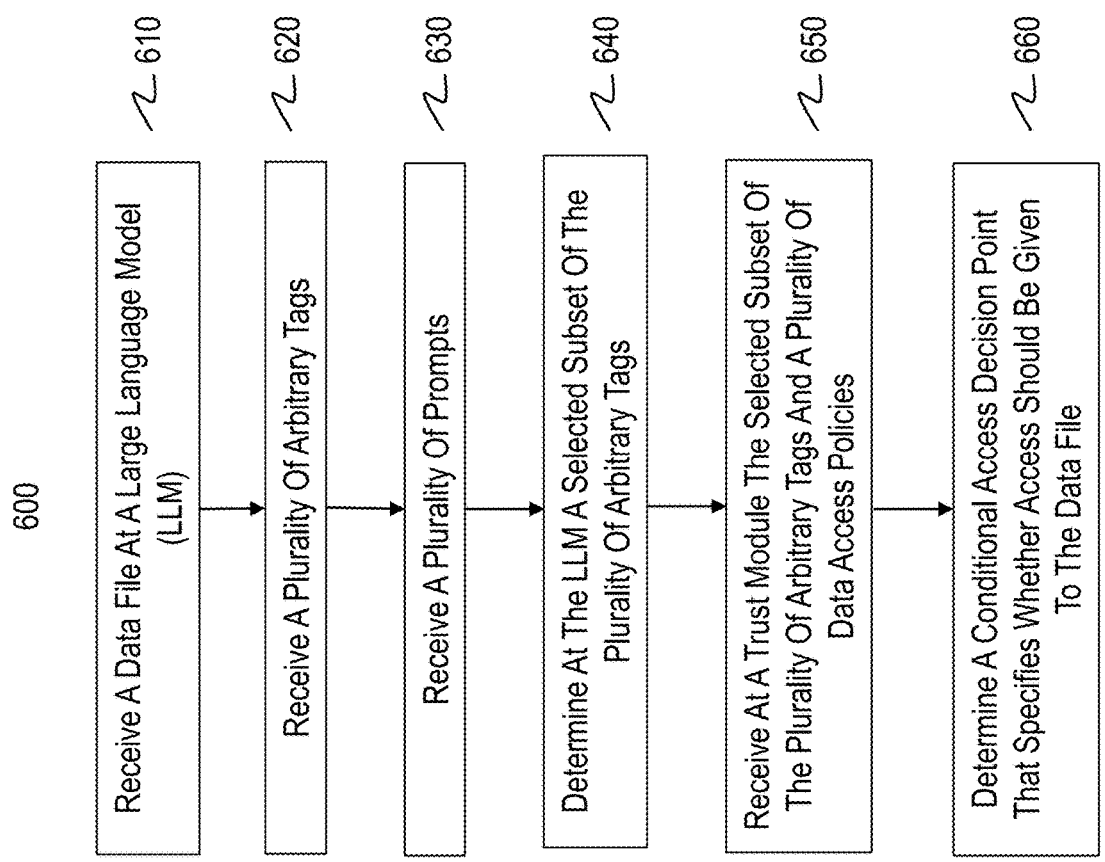
FIG. 6 discloses a flowchart of an example method for using a data authorization decision point according to the embodiments disclosed herein.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method 600 of a data authorization decision point is disclosed. The method 600 will be described in relation to one or more of the figures previously described, although the method 600 is not limited to any particular embodiment.

The method 600 includes receiving a data file at a large language model (LLM) (610). For example, as previously described the LLM 360 receives or accesses the data file 340. In some embodiments, the text extractor 350 extracts textual data 352 from the data file 340 and this is then received or accessed by the LLM 360.

The method 600 includes receiving a plurality of arbitrary tags that include one or more labels that are attachable to the data file (620). For example, as previously described the LLM 360 receives or accesses the arbitrary tags 310.

The method 600 includes receiving a plurality of prompts, each one of the plurality of prompts being paired with one of the plurality of arbitrary tags to thereby form an arbitrary tag-prompt pair, each one of the plurality of prompts including information that is used by the LLM 360 to find the one of the plurality of arbitrary tags that are paired with each one of the plurality of prompts (630). For example, as previously described the LLM 360 also receives or accesses the prompts 320. Each of the arbitrary tags 310 and the prompts 320 form an arbitrary tag-prompt pair. The prompts include information that is used by the LLM 360 to find the one of the arbitrary tags that are paired with the prompts.

The method 600 includes determining at the LLM a selected subset of the plurality of arbitrary tags that apply to the data file (640). As previously described, the LLM 360 uses the arbitrary tag-prompt pairs to determine the selected tags 370 that apply to the data file 340. In one embodiment, the arbitrary tag-prompt pairs are individually tested against the data file 340 or the textual data 352.

The method 600 includes receiving at a trust module the selected subset of arbitrary tags and a plurality of data access policies that specify access rules for the data file (650). As previously described the trust module 390 receives the selected tags 370 and the data access policies 380.

The method 600 includes, based on the selected subset of arbitrary tags and the plurality of data access policies received by the trust module, determining a conditional access decision that specifies whether access should be given to the data file (660). For example, as previously described the conditional access decision 395 is determined. In some embodiments, the determination of the conditional access decision 395 includes a confidence level 392 that is determined by the trust module 390.

G. Further Example Embodiments

Following are some further example embodiments of the invention. These are presented only by way of example and are not intended to limit the scope of the invention in any way.

Embodiment 1. A method, comprising: receiving a data file at a large language model (LLM); receiving a plurality of arbitrary tags that include one or more labels that are attachable to the data file; receiving a plurality of prompts, each one of the plurality of prompts being paired with one of the plurality of arbitrary tags to thereby form an arbitrary tag-prompt pair, each one of the plurality of prompts including information that is used by the LLM to find the one of the plurality of arbitrary tags that are paired with each one of the plurality of prompts; determining at the LLM a selected subset of the plurality of arbitrary tags that apply to the data file; receiving at a trust module the selected subset of arbitrary tags and a plurality of data access policies that specify access rules for the data file; and based on the selected subset of arbitrary tags and the plurality of data access policies received by the trust module, determining a conditional access decision that specifies whether access should be given to the data file Embodiment 2: The method of embodiment 1, wherein determining at the LLM the selected subset of the plurality of arbitrary tags that apply to the data file comprises: testing at the LLM each of the arbitrary tag-prompt pairs against the data file.

Embodiment 3: The method of embodiments 1-2, The method of claim 1, wherein determining the conditional access decision that specifies whether access should be given to the data file comprises: determining at the trust module a confidence level.

Embodiment 4: The method of embodiment 3, wherein the trust module determines the confidence using one or more of activity information that defines a context of the operating environment of the data file and metadata about the data file.

Embodiment 5: The method of embodiment 4, wherein the activity information includes one or more of information about a party trying to access the data file, a location where a request for the data file was made, a device the request for the data file was made from, and a time that the request for the data file was made.

Embodiment 6: The method of embodiments 1-5, further comprising: extracting textual data from the data file; and providing the extracted textual data to the LLM.

Embodiment 7: The method of embodiments 1-6, further comprising: generating one or more new data access policies; determining an efficiency of the one or more new data access policies; and adding the one or more new data access policies to the plurality of data access policies when the it is determined that the efficiency is acceptable.

Embodiment 8: The method of embodiment 7, wherein the one or more new data policies are not added to the plurality of data access policies when it is determined that the efficiency is not acceptable.

Embodiment 9: The method of embodiment 7, wherein determining an efficiency of the one or more new data access policies comprises: generating one or more new arbitrary tags; generating one or more new prompts that are paired with the one or more new arbitrary tags; generating a labeled dataset; and testing the performance of the LLM using the one or more new arbitrary tags, the one or more new prompts, and the labeled dataset.

Embodiment 10: The method of embodiment 9, further comprising: adding the one or more new arbitrary tags to the plurality of arbitrary tags and adding the one or more new prompts to the plurality of prompts when it is determined that the performance of the LLM is acceptable.

Embodiment 11: A system, comprising hardware and/or software, operable to perform any of the operations, methods, or processes, or any portion of any of these, disclosed herein.

Embodiment 12: A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to conduct executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
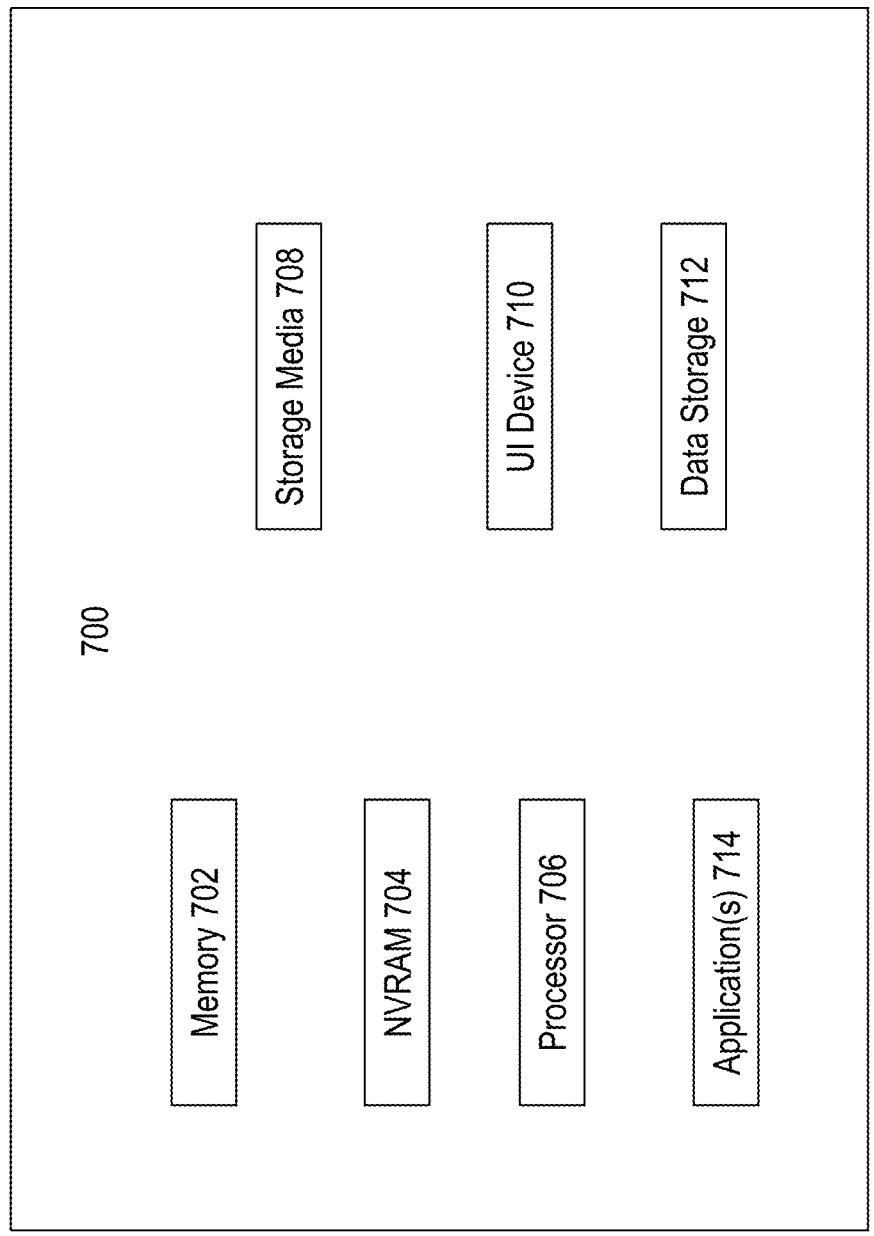
FIG. 7 discloses an example computing entity operable to perform any of the disclosed methods, processes, and operations.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage.

As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a data file at a large language model (LLM);
   receiving a plurality of arbitrary tags that include one or more labels that are attachable to the data file;
   receiving a plurality of prompts, each one of the plurality of prompts being paired with one of the plurality of arbitrary tags to thereby form an arbitrary tag-prompt pair, each one of the plurality of prompts including information that is used by the LLM to find the one of the plurality of arbitrary tags that are paired with each one of the plurality of prompts;
   determining at the LLM a selected subset of the plurality of arbitrary tags that apply to the data file using the plurality of prompts paired to the plurality of arbitrary tags;
   receiving at a trust module the selected subset of arbitrary tags and a plurality of data access policies that specify access rules for the data file; and
   based on the selected subset of arbitrary tags and the plurality of data access policies received by the trust module, determining a conditional access decision that specifies whether access should be given to the data file.

2. The method of claim 1, wherein determining at the LLM the selected subset of the plurality of arbitrary tags that apply to the data file comprises:
   testing at the LLM each of the arbitrary tag-prompt pairs against the data file.

3. The method of claim 1, wherein determining the conditional access decision that specifies whether access should be given to the data file comprises:
   determining at the trust module a confidence level.

4. The method of claim 3, wherein the trust module determines the confidence using one or more of activity information that defines a context of an operating environment of the data file and metadata about the data file.

5. The method of claim 4, wherein the activity information includes one or more of information about a party trying to access the data file, a location where a request for the data file was made, a device the request for the data file was made from, and a time that the request for the data file was made.

6. The method of claim 1, further comprising:
   extracting textual data from the data file; and
   providing the extracted textual data to the LLM.

7. The method of claim 1, further comprising:
   generating one or more new data access policies;
   determining an efficiency of the one or more new data access policies; and
   adding the one or more new data access policies to the plurality of data access policies when it is determined that the efficiency is acceptable.

8. The method of claim 7, wherein the one or more new data policies are not added to the plurality of data access policies when it is determined that the efficiency is not acceptable.

9. The method of claim 7, wherein determining an efficiency of the one or more new data access policies comprises:
   generating one or more new arbitrary tags;
   generating one or more new prompts that are paired with the one or more new arbitrary tags;
   generating a labeled dataset; and
   testing a performance of the LLM using the one or more new arbitrary tags, the one or more new prompts, and the labeled dataset.

10. The method of claim 9, further comprising:
    adding the one or more new arbitrary tags to the plurality of arbitrary tags and adding the one or more new prompts to the plurality of prompts when it is determined that the performance of the LLM is acceptable.

11. A non-transitory storage medium having stored therein instructions that are executable by one or more hardware processors to perform operations comprising:
    receiving a data file at a large language model (LLM);
    receiving a plurality of arbitrary tags that include one or more labels that are attachable to the data file;
    receiving a plurality of prompts, each one of the plurality of prompts being paired with one of the plurality of arbitrary tags to thereby form an arbitrary tag-prompt pair, each one of the plurality of prompts including information that is used by the LLM to find the one of the plurality of arbitrary tags that are paired with each one of the plurality of prompts;
    determining at the LLM a selected subset of the plurality of arbitrary tags that apply to the data file using the plurality of prompts paired to the plurality of arbitrary tags;
    receiving at a trust module the selected subset of arbitrary tags and a plurality of data access policies that specify access rules for the data file; and
    based on the selected subset of arbitrary tags and the plurality of data access policies received at the trust module, determining a conditional access decision that specifies whether access should be given to the data file.

12. The non-transitory storage medium of claim 11, wherein determining at the LLM the selected subset of the plurality of arbitrary tags that apply to the data file comprises:
    testing at the LLM each of the arbitrary tag-prompt pairs against the data file.

13. The non-transitory storage medium of claim 11, wherein determining the conditional access decision that specifies whether access should be given to the data file comprises:
    determining at the trust module a confidence level.

14. The non-transitory storage medium of claim 13, wherein the trust module determines the confidence using one or more of activity information that defines a context of an operating environment of the data file and metadata about the data file.

15. The non-transitory storage medium of claim 14, wherein the activity information includes one or more of information about a party trying to access the data file, a location where a request for the data file was made, a device the request for the data file was made from, and a time that the request for the data file was made.

16. The non-transitory storage medium of claim 11, further comprising:
   extracting textual data from the data file; and
   providing the extracted textual data to the LLM.

17. The non-transitory storage medium of claim 11, further comprising:
   generating one or more new data access policies;
   determining an efficiency of the one or more new data access policies; and
   adding the one or more new data access policies to the plurality of data access policies when it is determined that the efficiency is acceptable.

18. The non-transitory storage medium of claim 17, wherein the one or more new data policies are not added to the plurality of data access policies when it is determined that the efficiency is not acceptable.

19. The non-transitory storage medium of claim 17, wherein determining an efficiency of the one or more new data access policies comprises:
   generating one or more new arbitrary tags;
   generating one or more new prompts that are paired with the one or more new arbitrary tags;
   generating a labeled dataset; and
   testing a performance of the LLM using the one or more new arbitrary tags, the one or more new prompts, and the labeled dataset.

20. The non-transitory storage medium of claim 19, further comprising:
   adding the one or more new arbitrary tags to the plurality of arbitrary tags and adding the one or more new prompts to the plurality of prompts when it is determined that the performance of the LLM is acceptable.

\* \* \* \* \*